June 7, 1966  M. V. CLARK  3,254,382
MOLDING CLIP
Filed Nov. 29, 1963  2 Sheets-Sheet 1
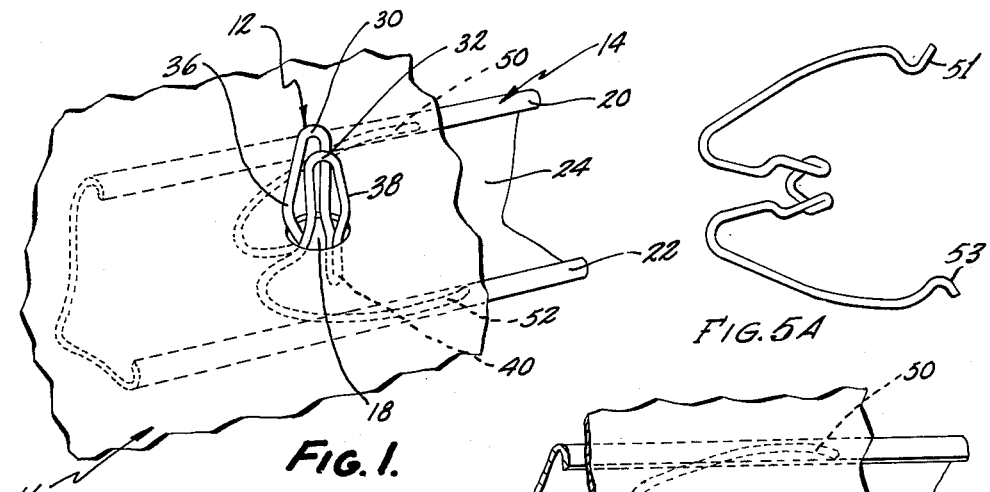
FIG. 1.
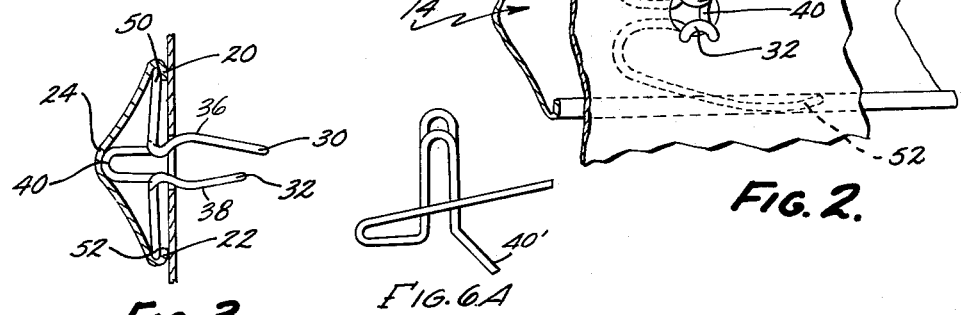
FIG. 2.
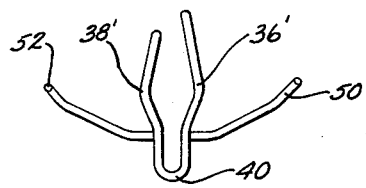
FIG. 3.
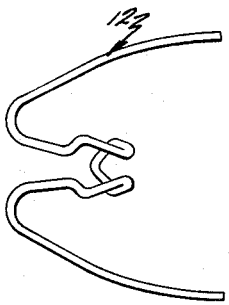
FIG. 4.
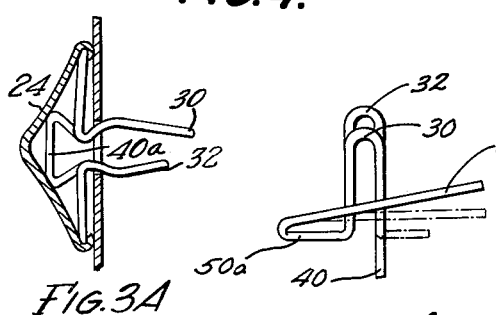
FIG. 3A. FIG. 6.
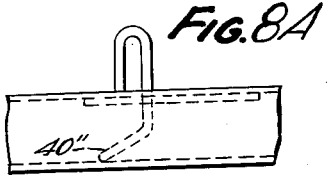
INVENTOR.
MARION V. CLARK
BY
ATTORNEYS June 7, 1966  M. V. CLARK  3,254,382
MOLDING CLIP
Filed Nov. 29, 1963  2 Sheets-Sheet 2

INVENTOR.
MARION V. CLARK
BY
ATTORNEYS

United States Patent Office 3,254,382
Patented June 7, 1966

3,254,382
MOLDING CLIP
Marion V. Clark, 2054 Marvin, Muskegon, Mich.
Filed Nov. 29, 1963, Ser. No. 327,007
10 Claims. (Cl. 24—73)

This invention relates to a molding clip, and more particularly to a spring wire molding clip for retaining a molding strip on a sheet material surface.

Of the two basic types of molding clips, spring wire and sheet metal, the former is often preferred for several reasons including ease of manufacture. However, the wire type molding clip is usually difficult to install and has less stability. Installation of wire molding clips must be made with special tools to get the clip end through the orifice in the sheet metal. It is often a tricky operation. Even when installed, the wire clip can exhibit considerable unstable tendencies, allowing the molding strip to become displaced sideways. The normal clip is in contact with the molding strip only on the flanges of the strip. The mere two point contact involved allows some molding strip displacement. Also, only a two point contact occurs between the clip end and the orifice walls of the sheet metal. This instability not only complicates assembly operations, but also prevents the molding strip from being positively and securely contacted and held. The contact of the clip on the molding strip is only in one plane. Liwewise, the contact of the clip on the sheet metal body is only in one plane. Thus, resistance to lateral displacement of either portion of the clip is at a minimum.

Conventionally, molding strips in general have another limitation. Each clip is only suitable for one width of moldign strip. Consequently, an entire series of clips must be manufactured and kept in supply for different width strips.

It is an object of this invention to provide a wire molding clip having complete ease of assembly, without any tools being required and without any special skills. Assembly is made quickly and simply with merely a push on the molding strip.

It is another object of this invention to provide a wire molding clip with excellent stability after installation. It has at least three point contact in three dimensions with the molding strip. It has four point contact with the sheet metal orifice walls.

It is another object of this invention to provide a wire molding clip having adaptability to secure molding strips of different widths, without any modification of the clip. The clip automatically accommodates the different widths with installation.

It is another object of this invention to provide a wire molding clip having an adjustably variable holding tension to suit the particular type of molding strip and sheet material involved.

Still a further object of this invention is to provide a wire molding clip which achieves all of the above features, and yet is of one piece of wire, formable on conventional equipment into the novel configuration.

These and several other objects of this invention will become apparent upon studying the following specification in conjunction with the drawings in which:

FIG. 1 is a perspective view of the first form of the molding clip shown assembled with a molding strip to a piece of sheet metal;

FIG. 2 is a perspective view of the molding clip in FIG. 1 taken from a different angle;

FIG. 3 is an end elevational sectional view of the molding clip in FIGS. 1, 2 and 3 in assembled condition;

FIG. 3A is an end elevational sectional view of a molding clip assembly, with the clip being slightly different from that in FIG. 3;

FIG. 4 is an end view of a slightly modified form of the molding clip in FIG. 3 shown in its free state;

FIG. 5 is a plan view of the molding clip illustrated in FIG. 3;

FIG. 5A is a plan view of a clip slightly different from that in FIG. 5;

FIG. 6 is an elevational view of a second form of the novel molding clip shown in its free state;

FIG. 6A is an elevational view of a clip slightly different from that in FIG. 6.

FIG. 8A is a side elevational view of a clip assembly employing a clip slightly different from that in FIG. 8;

Figure 7:
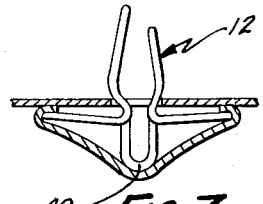
FIG. 7 is an end sectional view of the clip in FIG. 6 shown in assembled condition with a molding strip and sheet material.

Referring now specifically to the drawings, the first three forms of the invention, i.e. FIGS. 1 through 5A, FIGS. 6 through 8A, and FIGS. 9 and 10 are the preferred forms of the invention. The fourth and fifth forms of the invention illustrated in FIGS. 11 through 13, and FIG. 14 respectively, while being useful in some situations, are less preferred. Actually, the first three forms of the invention are very similar to each other, with only minor variations being made to show three possibilities of several additional minor structures which can be made without departing from the inventive concept.

Referring to the first form of the invention illustrated in FIGS. 1 through 5A, the complete assembly 10 is shown to include the novel clip 12, the molding strip 14, and the sheet metal material 16 which normally is an automobile body. For attachment of the molding strip 14 to the sheet material 16, the latter includes a series of linearly oriented orifices 18 along the area to be covered.

The molding strip 14 includes a pair of flanges 20 and 22 in conventional fashion which are the terminal portions of the side edges of the strip. These are directed toward each other. The intermediate portion of the strip is an elongated bulging portion which includes a convex outer surface and a concave inner surface. The novel clip cooperates with this concave inner surface 24 in a manner to be described.

The novel wire clip is formed of a unitary integral piece of wire, bent into the novel configuration. The clip is generally symmetrical from its center to both ends but may be slightly unsymmetrical because of slight differences in the two clip ends which protrude through the orifice 18 of the sheet metal. Each of these two clip ends 30 and 32 includes a pair of legs with an intermediate bight. The legs are generally divergent from the orifice 18 to the central portion of the clip ends and then generally convergent toward the bights. Thus, the ends of the clip ends to be protruded first into the opening are readily inserted because of this tapered convergence to the bights. The divergent portions are resiliently flexible to enable the legs to be flexed temporarily toward each other against a bias when they are inserted through the opening. They, of course, expand again upon being pushed through the opening, to serve as retention means. This divergence may be achieved by forming suitable knee bends 36 and 38 on the one or both legs of each clip end. These knee bends can be formed in the general plane of the two legs of each clip end so that the legs of each clip diverge away from each other and converge again. Alternatively, the knee bends can be formed in both legs of each clip so that the knees of one clip end are divergent with respect to the other clip end. This slight variation is shown by the knee bends 36' and 38' in FIG. 4. Therefore, the description of the clip ends as being divergent-convergent from the orifice position to the bight outer ends includes both of these variations.

Where the four legs of the two clip ends protrude through the opening toward the molding strip, one leg of clip end 30 and one leg of clip end 32, being adjacent each other, are extended generally in the same direction beyond the opening to form a molding abutting tang or projection 40. This projection tang abuts the concavity 24 of the outermost portion of the molding strip as illustrated in FIG. 3.

The other two legs of the respective two snap ends 30 and 32 are bent transversely of the snap ends adjacent the opposite side of the sheet metal. These extend a short distance generally axially of the molding strip, and then are bent away from each other toward the flanges of the molding strip. The terminal end portions of the wire are then bent backwardly in the opposite direction toward the opposite end of the molding strip while diverging to form resilient arms 50 and 52.

These arms engage the side edges of the molding strip on top of flanges 20 and 22. The arms are resiliently flexible with respect to each other so that they can be deformed toward each other. They have a bias away from each other into interengagement with the two grooves of the opposite sides of the molding strip adjacent the flanges. Also, these two arms are generally in the same plane, which is substantially perpendicular to the plane of tang 40 and the plane of snap ends 30 and 32. They are at a substantially acute angle with respect to the snap ends when in the free state. Thus, referring to FIG. 4, it will be noted that arms 50 and 52, in their free state, extend toward the ends of the snap ends, and substantially away from the tang 40.

It will be realized that the specific configuration of these arms may vary slightly, as well as the exact configuration of the varied ends of the terminal arms. Thus, referring to FIG. 5A, for example, the hook portions 51 and 53 illustrate one type of modification possible.

Since the two arms 50 and 52 can be flexed toward each other without interfering with the operation of the clip, the molding strip to which it is attached may vary in width. A typical example of a molding strip width variation is the adaptability of a clip two inches in width from end to end of the arms to accommodate a molding strip between 1¼ inches to 1 9/16 inches between the flanges. This is just one example.

When the clip is installed, the two double snap ends form a four point contact on the wall of orifice 18 in the sheet metal body. Consequently, the two dimensional arrangement of these four contact points provides excellent stability for the clip. This effect is coupled with the unique three point contact of the clip on the molding strip. The tang 40 contacts the central portion of the clip in a stabilizing manner beneath the bulge of the strip, while the two arms extend into the flange grooves. The three point contact of the molding strip supplements the four point contact of the sheet metal body to result in an extremely stable structure.

To install the novel clip, the clip is first positioned in the molding strip by flexing arms 50 and 52 toward each other and allowing them to spring back into the flange grooves of the strip. The strip is then placed over the orifice 18 so that the bights of the snap ends are positioned slightly in the orifice. Then the molding strip is merely pushed from the outside toward the body. The three point contact of the clip, including the tang beneath the center portion, causes the clip to be smoothly and unidirectionally inserted into the orifice. The clip does not bend over sideways. The knee bends of the legs of the snap ends deflect temporarily to pass through the orifice, and spring back into place. There is no tendency for the clip to trip or bend, due to excellent three dimensional contact between the clip and the molding strip. The clips are merely "popped" into place, in a matter of seconds, to effect the stable combination.

Conceivably, arms 50 and 52 of the clip may be bent in a slightly different manner for control of the tension of the clip and thus the strip attachment on the body metal. This may be achieved, for example, as illustrated in FIG. 6, by bending the arms 50' at an acute angle with respect to portion 50a of the arms that initially extends away from the snap ends. When installed, the arms will be sprung to the position illustrated in phantom in FIG. 6 for control of the tension of mounting.

Figure 8:
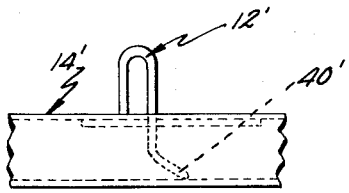
FIG. 8 is a side elevational view of the assembled molding clip of FIG. 6A.

Also, it is conceivable that tang 40 can be bent to the position shown at 40' in FIGS. 6A and 8 or to that shown at 40'' in FIG. 8A to accommodate a particular type of molding strip such as a shallow molding strip. Consequently, it will be realized that the novel clip not only has adaptability to different widths of strips but also to different depths of strips. A typical installation of the strip with the tang bent is illustrated in FIG. 8 with a shallow molding strip 14'. This modified clip 12' still utilizes the basic principles set forth with respect to the first form of the invention in FIGS. 1 through 5A. The snap ends still have the knee bends to form divergent-convergent relationships from the one end of the snap ends to the opposite end. It will be also readily apparent that the exact end configuration of the tang 40 can be varied somewhat from the arcuate surface shown to a flat end surface, as at 40a in FIG. 3A, or the like, to suit a particular molding strip configuration. All of these variations, however, include the four point contact of the clip ends with the sheet metal, and the three point contact of the two arms and the tang of the clip with the molding strip.

Figure 9:
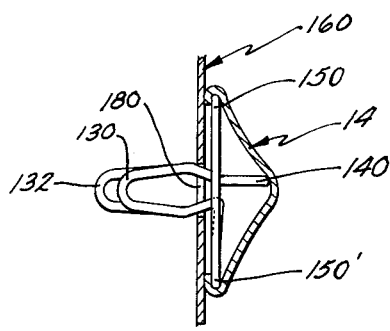
FIG. 9 is a sectional end elevational view of a third form of molding clip shown in assembled condition with a molding strip and sheet material.
Figure 10:
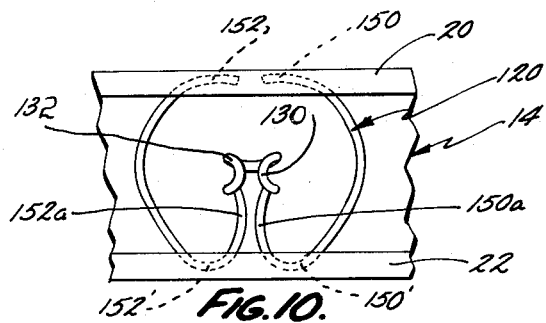
FIG. 10 is a plan view of the assembly in FIG. 9.

In the third modification of the clip shown in FIGS. 9 and 10, the free terminal arms 150 and 152 of the modified clip 120, instead of engaging the two respective flanges, both engage the same flange 20 of the molding strip 14. The opposite flange 22 of the molding strip is engaged by the curved bights 150' and 152' of the respective resilient arms 150 and 152 between the free terminal ends thereof and the portions of the arms 150a and 152a that are integral with the two respective legs of the clip ends 130 and 132. The tang 140 in this instance is thus in a plane perpendicular to its arrangement in the previous forms of the invention. Here again, it engages the outermost concavity of the molding strip bulge. The contact of the molding strip with the clip has a three point, three dimensional nature. The contact of the snap ends with the sheet metal material 160 has four point contact in two dimensions. It will be realized that the two dimensional contact is the best that can be achieved with the sheet metal since it is in itself two dimensional, and that the three dimensional contact with the molding strip is the best that can be obtained. Therefore, the clip has optimum engagement.

This modified form of clip is installed exactly like the previous forms. That is, it is initially inserted in the molding strip, the snap ends are placed above orifice 180 of sheet metal material 160, and the molding strip is pressed against the sheet metal so that the tang and flanges are pushed bodily. The snap ends engage on the opposite side of the sheet metal.

Figure 11:
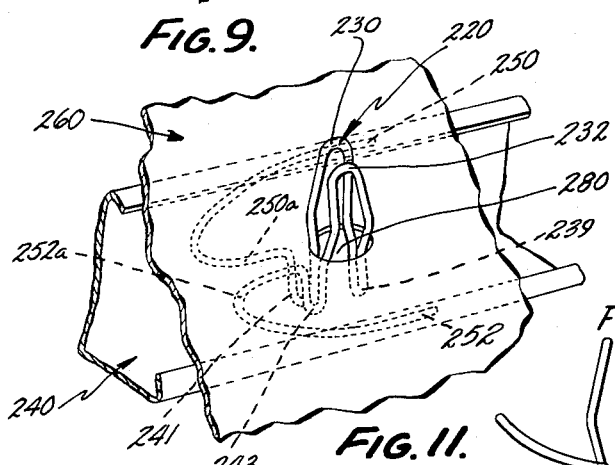
FIG. 11 is a perspective view of a fourth form of the novel clip shown in assembled form.
Figures 12, 12A:
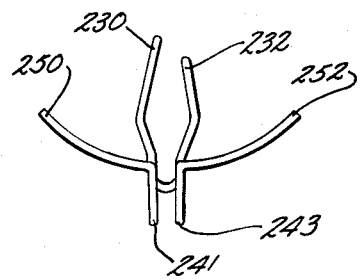
FIG. 12 is an end view of the clip in FIG. 11 shown in its free state.
FIG. 12A is an end view of a clip slightly different from that in FIG. 12.
Figure 13:
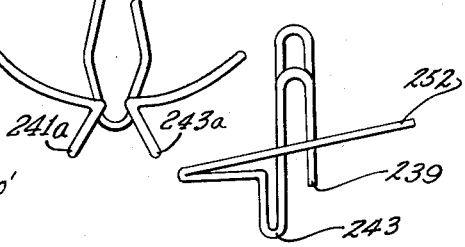
FIG. 13 is a side elevational view of the clip in FIG. 12 shown in its free state.

A less preferred form of the invention is illustrated in FIGS. 11, 12, 12A and 13. The very form of the invention provides less stability than the previous forms, but this form of the invention is preferred for some particular applications such as wide molding strips. It does provide a double tang, or, if preferred a triple tang construction. Referring to FIGS. 11 through 13, the assembly includes modified clip 220 engaged with sheet metal material 260 and molding strip 240 through an orifice 280 in the sheet metal material. In this instance, the legs of the snap ends 230 and 232 which protrude through the opening toward the molding strip have a small integral interconnecting tang 239 in common on one end of each snap end, and also have two additional tangs 241 and 243 on the respective ends. These are formed by extension of the legs of the snap ends through the orifice and out until contact with the molding strip is made with a pair of twin bights. The wire element is bent back toward the sheet metal body, and then parallel to the body to form portions 250a and 252a which extend in the generally same direction axially as the molding strip. These portions are then bent back upon themselves in a divergent fashion to form the free ends 250 and 252 of the resilient arms.

In some instances it is desirable to make the first tang 239 shorter, so that it only serves as an integral connection between the snap ends. In other instances it is desirable to extend this tang generally coextensive with tangs 241 and 243 to form a three point tang contact and thus a five point contact between the clip and the molding strip. Even without lengthening this tang, however, a four point contact is achieved on the molding strip. This four point contact can be very effective, especially if the tangs are bent to the positions illustrated at 241a and 243a in FIG. 12A. This is particularly adaptable to a wide molding strip so that over-all contact area between the strip and clip is increased. The reason why this structure is not preferred for some instances is that the formation of tangs 241 and 243 out of the leg portions which extend into the connecting arms 250 and 252, lessens the strength of these arms and displaces the tang from a position directly opposite the snap ends. Thus, installation of the clip is not quite as readily made nor as rigid in structure upon final installation. It can be employed to advantage, however, with wide molding strips as mentioned hereinabove.

Figure 14:
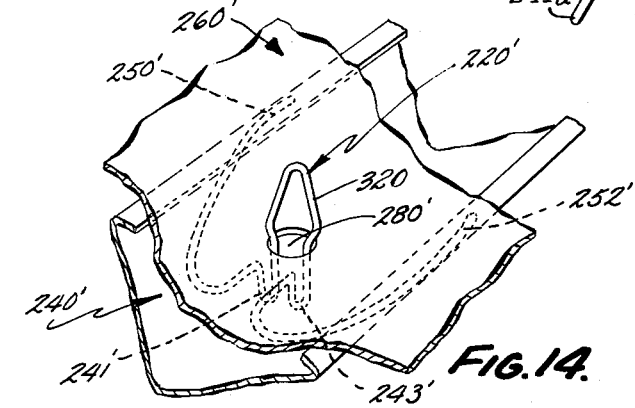
FIG. 14 is a perspective view of an assembly of a fifth form of clip similar to the fourth form of the clip.

The fifth form of the clip in FIG. 14 is closely similar to that in FIGS. 11 through 13 except that it only has two-point contact with the sheet metal orifice wall. In this clip 220', the arms 250' and 252' that engage the molding 240' terminate in the pair of tangs 241' and 243'. The opposite legs of these tangs extend through the opening 280' and join into a single snap end 320. The snap end has two knee bends in its legs that engage the wall of opening 280' of sheet metal 260'. The two-point contact is useful for small moldings.

Various other additional minor modifications can be made in the structure in consistency with the principles taught herein, without departing from the inventive concept taught. The invention is therefore not to be limited to any one exact form of the invention illustrated, but is to be limited only by the scope of the appended claims and the reasonably equivalent structures to those defined therein.

I claim:

1. A molding slip comprising an integral wire having a pair of adjacent, doubled-back divergent-convergent snap ends extending generally unidirectionally, and having four adjacent leg portions; certain of the legs of said snap ends being extended to form abutment tang means to engage the central portion of a molding strip, and certain of the legs being bent into a pair of terminal resilient, flexible flange-engaging retention arms on opposite sides of said ends and in a plane transverse to said ends; said tang means being generally transverse to the plane of said arms and on the opposite side of said plane from said leg portions.

2. A molding clip comprising an integral wire having a pair of adjacent, doubled-back snap ends extending generally unidirectionally, each with a pair of legs to form four adjacent leg portions; said legs being divergent-convergent to engage in an orifice; two leg portions of the two snap ends being bent in a plane transverse to said snap ends, and away from each other into a curved configuration to form terminal flange retention arms resiliently flexible toward and away from each other; the other two leg portions of the two snap ends being extended beyond the plane of said arms, and being integrally joined to form a tang opposite said snap ends to abut a molding strip.

3. A molding clip comprising an integral wire element, the central portion of said wire element being bent back upon itself to form a projecting tang, both sides of said tang being bent back upon themselves to form two clip ends; said clip ends both projecting in a direction generally opposite to the projecting direction of said tang; the two bent back legs of said two clip ends being bent transversely of both said tang and said clip ends, intermediate said tang and clip ends, into a pair of terminal arms; and said arms being initially divergent and curved to a generally unidirectional orientation to form flange retention means in a plane transverse to said clip ends and tang, with said clip ends on one side thereof and said tang on the other side thereof.

4. The clip in claim 2 in which said arms in their free state are at an acute angle with respect to said tang.

5. The clip in claim 1 in which all four of said legs are extended to form three tangs projecting generally opposite to said snap ends.

6. The clip in claim 1 in which the legs bent into arms are also extended intermediate said arms and snap ends to form a pair of tangs projecting generally opposite to said snap ends, and the other legs are integrally interconnected, with each other.

7. The clip in claim 6 in which said pair of tangs are divergent to each other.

8. A molding clip comprising: a unitary preformed wire element including a pair of flexible divergent-convergent snap end protrusions for insertion through and securement in an opening in the sheet element; each of said snap ends including portions folded back upon themselves to form four legs; one leg of one snap end and one leg of the second snap end being extended to form an integral, molding strip abutting tang opposite said legs; the second ends of said legs being bent transversely of said legs and tang, and away from each other, forming flexible terminal arms for engagement with opposite edges of a molding strip.

9. The clip in claim 8 in which said tang is bent at an obtuse angle with respect to said snap ends.

10. A molding assembly comprising: an orificed sheet material; a molding strip having an elongated convexity with an internal concavity, and a pair of side flanges bent toward each other to abut the sheet material; a molding clip retaining said strip to said sheet material, and comprising a unitary configurated wire element, the terminal ends of said element comprising a pair of curved, resilient arms in engagement with said flanges; the central portions of said wire protruding transversely of said arms and forming legs adjacent each other and folded back upon themselves; said legs protruding through an orifice in said sheet material and including flexible divergent portions retaining said clip and strip against said sheet material with a four point contact; and one end of both of said legs extending beyond the plane of said arms to form on integral tang opposite said legs and said orifice in abutment with said internal strip concavity to form a three dimensional, three point contact with said strip.

References Cited by the Examiner

UNITED STATES PATENTS 1,948,462  2/1934  Le Page _____ 24—213

WILLIAM FELDMAN, *Primary Examiner.*

DONLEY J. STOCKING, *Examiner.*

E. SIMONSEN, *Assistant Examiner.*